Aug. 6, 1929.  C. W. BECK  1,723,004
STEERING WHEEL
Filed Oct. 18, 1926   2 Sheets-Sheet 1
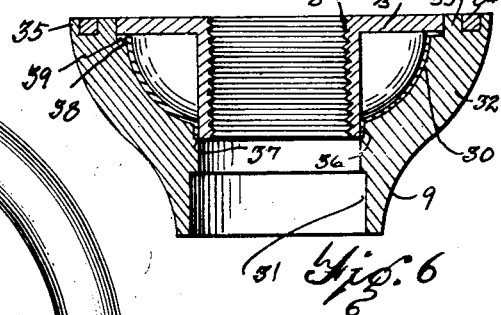
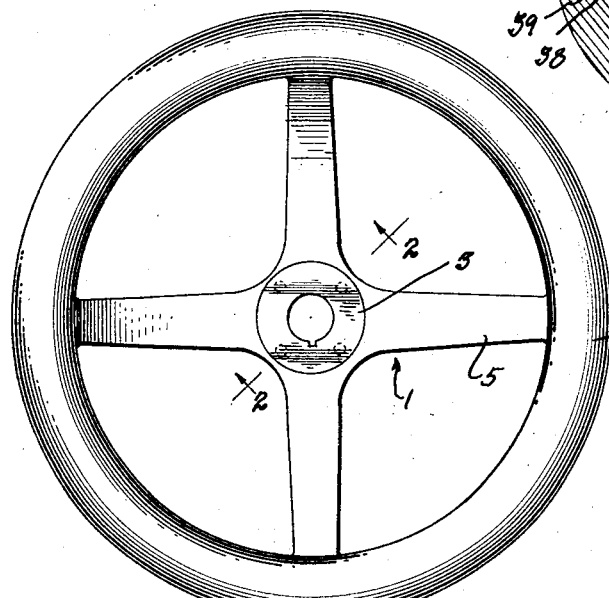
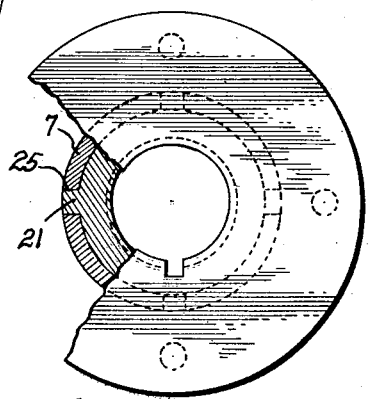
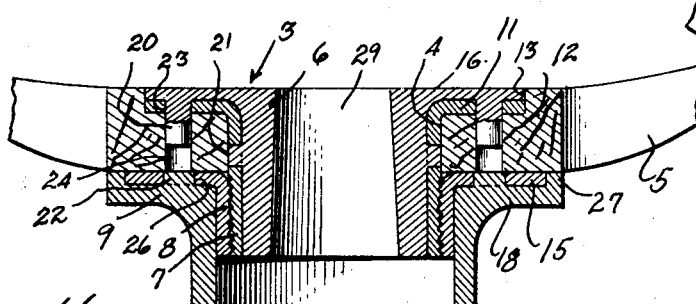
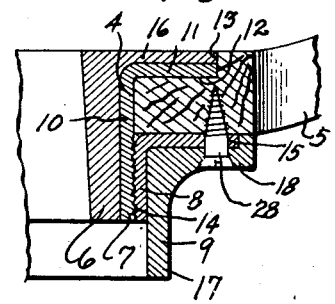
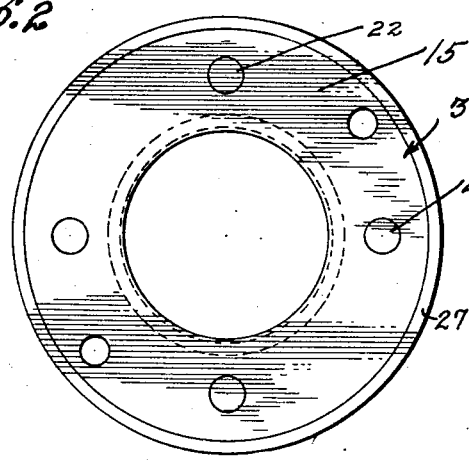
INVENTOR.
Charles W. Beck
BY
ATTORNEYS

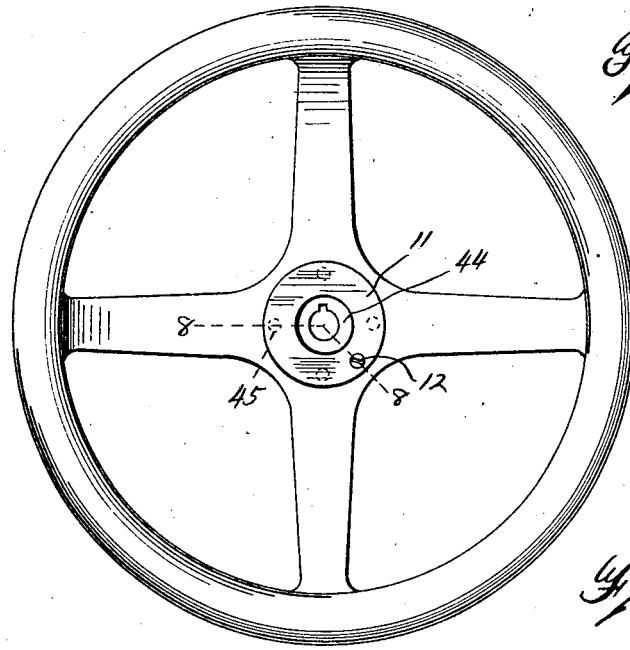
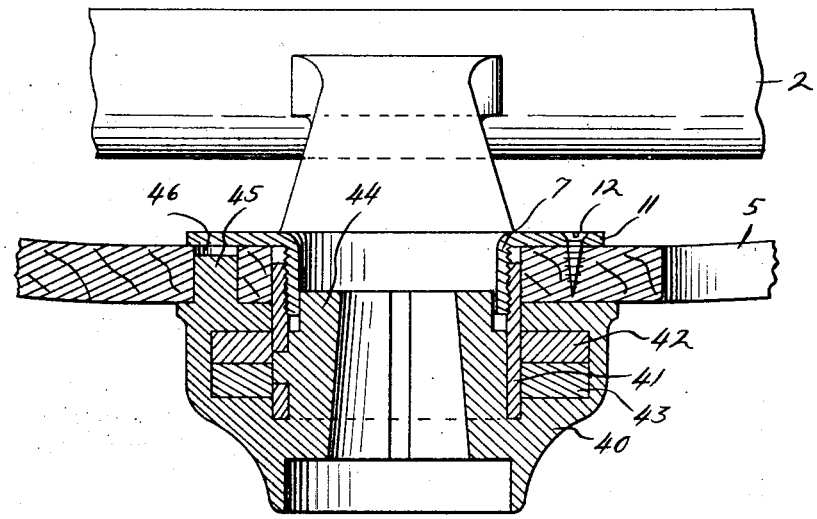

Patented Aug. 6, 1929.

1,723,004

UNITED STATES PATENT OFFICE.

CHARLES W. BECK, OF TOLEDO, OHIO, ASSIGNOR TO BECK-FROST CORPORATION, OF DETROIT, MICHIGAN, A CORPORATION OF MICHIGAN.

STEERING WHEEL.

Application filed October 18, 1926. Serial No. 142,396.

This invention relates to steering wheels for motor vehicles, boats and the like and consists of certain novel features of construction, combinations and arrangements of parts as will be hereinafter more fully described and particularly pointed out in the appended claims.

In the accompanying drawings:

Figure 1 is a top plan view of a steering wheel embodying my invention.

Figure 2 is a fragmentary sectional view taken on the line 2—2 of Figure 1.

Figure 3 is a top plan view of the outer hub section.

Figure 4 is a fragmentary top plan view of the inner hub sections.

Figure 5 is a fragmentary vertical sectional view through the wheel at the hub.

Figure 6 is a vertical sectional view through a slightly modified hub construction.

Figure 7 is a top plan view of another modification.

Figure 8 is a sectional view taken on the line 8—8 of Figure 7.

Referring now to the drawing, 1 is a spider, 2 is a rim, and 3 is a hub of a steering wheel embodying my invention. As shown, the spider which is preferably formed of wood is provided with the central opening 4 and a plurality of radially extending arms 5. The rim 2 may be formed of any suitable material and is secured to the outer ends of the spider arms 5 while the hub 3 is preferably formed of a plurality of sections 6, 7, 8 and 9 respectively and has two of said sections, preferably the inner sections 6 and 7 respectively mounted in the spider opening 4. To provide a strong and durable construction which can be easily and quickly assembled and taken apart, the section 7 has a tubular portion 10 that fits snugly against the inner walls of the opening 4 and is provided at its upper end with a lateral flange 11 that preferably rests upon the base 12 of an annular recess 13 in the upper face of the spider; while the section 8 has a tubular portion 14 that threadedly engages the tubular portion 10 of the section 7 and is provided at its upper end with a lateral flange 15 that seats against the lower face of the spider. Both of these sections 7 and 8 respectively are sheet metal stampings, while the sections 6 and 9 respectively are preferably metal castings. As shown, the inner section 6 is cast within the tubular portion of the section 7 and is provided at its upper end with a lateral flange 16 that rests upon the flange 11 in the recess 13, while the outer section 9 has a tubular portion 17 that is cast upon the tubular portion of the section 8 and is provided at its upper end with a lateral flange 18 that rests against the lateral flange 15 of the intermediate section 8. Relative movement between the sections 6 and 7 respectively and between the sections 8 and 9 respectively is prevented by the provision of lugs 20, 21 and 22 respectively. As shown, the lugs 20 project downwardly from the lateral flange 16 and engage aligned openings 23 and 24 respectively in the flange 11 and spider 1; the lugs 21 project radially from the inner section 6 and engage openings 25 in the intermediate sections 7; and the lugs 22 project upwardly from the lateral flange 18 and engage openings 26 in the lateral flange 15 of the intermediate section 8. Preferably, the lateral flange 18 is provided with the marginal upstanding flange 27 that surrounds and conceals the edges of the lateral flange 15 and rests against the lower face of the spider 1, while headed elements such as the screws 28 are used to secure the flanges 18 and 15 respectively to the spider. To permit the assembled parts to be readily mounted on the usual steering column (not shown) the inner section 6 has a longitudinally extending upwardly tapered opening 29 for receiving the usual steering stem, while the tubular portion of the outer section 9 preferably projects a short distance below the sections 6, 7 and 8 respectively and is adapted to receive the upper end of the steering column.

Thus, from the foregoing description, it will be readily apparent that I have provided a strong and durable wheel of the built-up type that is neat in appearance, comparatively light in weight, and inexpensive to manufacture. Due to the threaded engagement of the intermediate sections 7 and 8 the inner section 6 may be readily cast within the stamping 7 and the outer section 9 may be readily cast upon the stamping 8 before assembling with the spider 1. This enables the metal parts and the wood spider to be finished separately. After the respective subassemblies of the sections 6 and 7 respectively and the sections 8 and 9 respectively, are made they may be easily and quickly secured together in proper engagement with the spider.

In Figure 6 I have shown a slight modification in which a light sheet metal stamping 30 is preferably located between the outer and intermediate sections 8 and 9 respectively of the hub. As shown, the outer section 9 has a tubular portion 31 for receiving the steering column and stem and is provided with the upwardly flaring portion 32 that seats against the lateral flange 15 of the section 8. The outer section 9 is also provided at its upper end with the upstanding lugs 33 that engage suitable openings 34 in the flange 15 and has an upstanding marginal flange 35 that surrounds and conceals the outer edges of the flange 15. The sheet metal stamping 30 preferably conforms in shape to and seats against the flaring portion 32 of the outer section 9. Preferably this stamping 30 has an annular depending flange 36 that seats within a suitable recess 37 in the outer section 9 and has a lateral flange 38 that is received in an annular recess 39 in the flaring portion 32 of the outer section. Thus, with this construction, these three parts 8, 9 and 30 respectively may be assembled as a unit and then threaded upon the tubular portion 10 of the intermediate section 7 in the spider.

In Figures 7 and 8 I have shown another modification in which the outer section 40 of the hub is preferably a metal casting and is anchored upon a tubular section 41 which in turn rotatably engages the tubular portion of the section 7. As shown, the lateral flange 11 of the section 7 is secured by a suitable headed element such as a screw 12 to the wood spider, while the section 41 is preferably surrounded by two metal rings 42 and 43 respectively which are embedded in the metal casting 40. In the process of construction these rings are sleeved upon the section 41 before being blanked within the mold. It will also be noted that this casting 40 has the upstanding tubular portion 44 that projects upwardly within the tubular portion of the section 7 and is free to turn therein. This casting also has the upstanding lugs 45 which engage suitable openings 46 in the wood spider.

While it is believed that from the foregoing description, the nature and advantage of my invention will be readily apparent, I desire to have it understood that I do not limit myself to what is herein shown and described and that such changes may be resorted to when desired as fall within the scope of what is claimed.

What I claim as my invention is:

1. In combination, a wheel hub having an inner sheet metal stamping provided with a lateral flange, a casting in said stamping having an opening for receiving a steering stem and having a lateral flange secured to the lateral flange of said stamping, a spider surrounding the stamping, and means maintaining said spider upon said stamping, said means including a part engaging said stamping.

2. In combination, a wheel hub having an inner sheet metal stamping provided with a lateral flange, a casting in said stamping, having an opening for receiving a steering stem and having a lateral flange secured to the lateral flange of said stamping, a spider surrounding the stamping, and means maintaining said spider upon said stamping, said means including a part rotatably mounted on said stamping.

3. In combination, a wheel hub having an inner sheet metal stamping provided with a lateral flange, a casting in said stamping having an opening for receiving a steering stem and having a projection extending through the lateral flange of said stamping, and a spider secured to said stamping and having an opening receiving the projection of the casting so that relative movement between said casting, stamping and spider is prevented.

4. In combination, a wheel hub having an inner sheet metal stamping provided with a lateral flange and an outer sheet metal stamping threadedly engaging the first mentioned stamping and having a lateral flange spaced from the lateral flange aforesaid, and a spider surrounding the inner stamping in the space between said lateral flanges.

5. A wheel hub having inner and outer sheet metal stampings, a casting within the inner stamping having an opening for receiving a steering stem, a casting upon the outer stamping having an opening for receiving a steering column, and connections between the respective castings and stampings preventing movement of said castings relative to said stampings.

6. A wheel hub having an inner sheet metal stamping provided with a lateral flange, a casting within said stamping having an opening for receiving a steering stem, an outer sheet metal stamping having a flange spaced from the flange aforesaid to receive a spider therebetween, and a casting on the outer stamping adapted to receive a steering column.

7. In combination, a wheel hub having concentric inner and outer sheet metal stampings provided with vertically spaced lateral flanges, a casting within and secured to said inner stamping and having an opening for receiving a steering stem, a casting on the outer stamping adapted to receive a steering column, and a spider surrounding the inner stamping between the lateral flanges aforesaid.

8. In combination, a wheel hub having concentric inner and outer sheet metal stampings, a casting within and secured to the inner stamping and having a lateral flange, a casting on the outer stamping adapted to receive a steering column and having a lateral flange, and a spider surrounding the inner stamping between the lateral flanges aforesaid.

9. In combination, a wheel hub having an inner sheet metal stamping, a casting in said stamping having an opening for receiving a steering stem, a spider surrounding the stamping, and means maintaining said spider upon said stamping including a part engaging said stamping.

10. In combination, a wheel hub having tubular parts threadedly engaging each other, a lining for the innermost tubular part comprising a part cast within said tubular part and having an opening for receiving a steering stem, a covering for the outermost tubular part comprising a part cast upon the said outermost tubular part and having means for receiving a portion of a steering column, and a spider secured to and disposed between portions of the parts aforesaid.

11. In combination, a wheel hub having tubular sheet metal parts threadedly engaging each other, a lining for the innermost sheet metal part comprising a tubular part cast within said tubular part, a covering for the outermost tubular part comprising a tubular part cast upon the said outermost tubular part, and a spider secured to and disposed between portions of the castings aforesaid.

12. In combination, a wheel hub having an inner casting provided with a longitudinally extended opening for receiving a steering stem, an outer casting provided with means for receiving an end portion of a steering column, a spider having portions disposed between portions of said castings, and a detachable connection between said castings permitting removal of said spider from between said castings including parts respectively interlocked with said castings and threadedly engaging each other.

13. In combination, a wheel hub having an inner casting provided with a longitudinally extending opening for receiving a steering stem, an outer casting provided with means for receiving an end portion of a steering column, a spider having portions disposed between portions of said castings, and a detachable connection between said castings permitting removal of said spider from between said castings including tubular parts carried by said castings and threadedly engaging each other.

14. In combination, a wheel spider, and a hub having two sections detachably connected together and having lateral flanges above and below said spider, and a casting within and secured to the innermost of said sections and having a lateral flange overlapping the flanges aforesaid and provided with depending projections constituting lugs extending through the uppermost of said lateral flanges and into said spider, said lugs being concealed by the lateral flange of the casting and serving to retain said spider against movement relative to said hub.

15. In combination, a wheel spider, and a hub having a tubular section below said spider and provided with a lateral flange, and another section connected to the section aforesaid and having a lateral flange overlapping the wheel spider and provided with depending projections constituting lugs extending into said spider and preventing the latter from moving relative to said hub, said lugs being a part of and entirely concealed by the lateral flange of the last mentioned section of said hub.

16. In combination, a wheel hub having inner and outer sheet metal stampings detachably connected together and provided with vertically spaced lateral flanges, a casting within and secured to the inner stamping and having an opening for receiving a steering stem, and a spider surrounding said inner stamping between the vertically spaced lateral flanges aforesaid.

17. In combination, a wheel hub having an inner casting provided with means for receiving a steering stem, an outer casting provided with means for receiving an end portion of a steering column, a spider having portions disposed between the portions of said castings, and a connection between said castings permitting removal of said spider from between said castings including parts respectively interlocking with said castings and detachably connected to each other.

18. In combination, a wheel spider, and a hub having two sheet metal sections detachably connected together, and having flanges disposed upon opposite sides of said spider and clamping the latter therebetween, and a casting upon the innermost of said stampings having means for receiving a portion of the steering stem and having a lateral flange overlapping the uppermost flange of said stampings and secured to said spider.

19. In combination, a wheel spider, and a hub having two spider engaging sections detachably connected together, and a casting with and secured to the innermost of said sections and having a longitudinally extending bore for receiving a steering column, said casting also having a lateral flange overlapping the said spider and provided with depending projections constituting lugs extending into said spider, said lugs being concealed by the lateral flange of the casting and serving to retain said spider against movement relative to said hub.

In testimony whereof I affix my signature.

CHARLES W. BECK